FERROELECTRIC AND PIEZOELECTRIC COMPOSITION

Filed March 11, 1968 2 Sheets-Sheet 1

Triangular Compositional Diagram
Of The Ternary System
$Pb(In_{1/2}Nb_{1/2})O_3$ - $PbZrO_3$ - $PbTiO_3$ (mol %)

INVENTORS
Mitsuo Osada
Osamu Kumon
Tatsuya Nishimoto
BY
Sughrue, Rothwell, Mion, Zinn & Macpeak
ATTORNEYS

FERROELECTRIC AND PIEZOELECTRIC COMPOSITION

Filed March 11, 1968 2 Sheets-Sheet 2

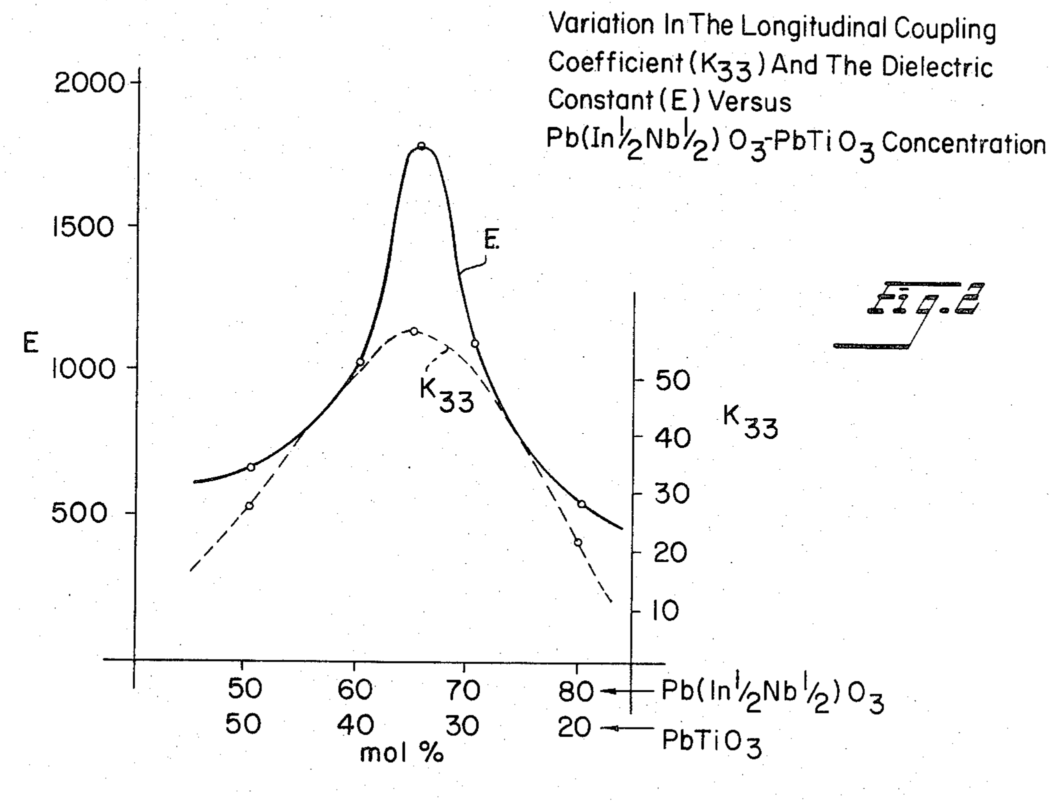

Variation In The Longitudinal Coupling Coefficient ($K_{33}$) And The Dielectric Constant (E) Versus $Pb(In_{1/2}Nb_{1/2})O_3$-$PbTiO_3$ Concentration

FIG. 2

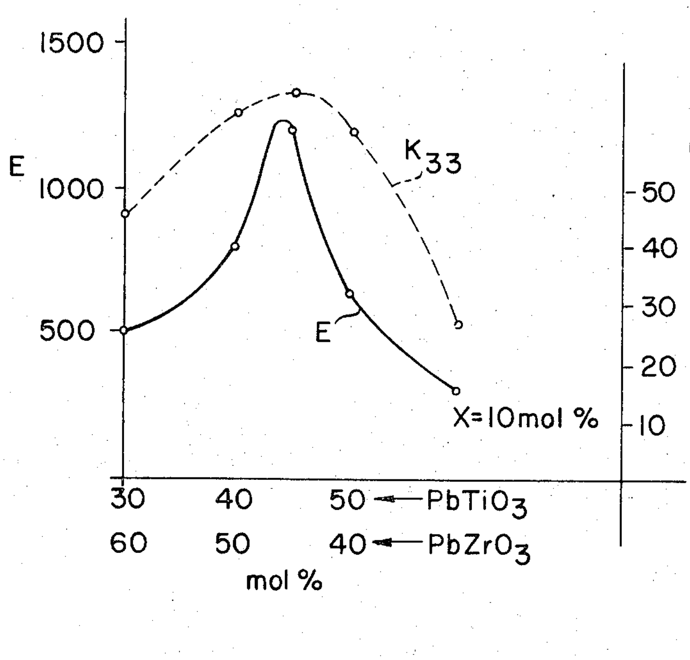

Variation In The Longitudinal Coupling Coefficient ($K_{33}$) And The Dielectric Constant (E) Versus $PbTiO_3$–$PbZrO_3$ Concentration [$Pb(In_{1/2}Nb_{1/2})O_3$ Constant At 10 mols %]

FIG. 3

INVENTORS
*Mitsuo Osada*
*Osamu Kumon*
*Tatsuya Nishimoto*

BY *Sughrue, Rothwell, Mion, Zinn & Macpeak*
ATTORNEYS

United States Patent Office 3,630,908
Patented Dec. 28, 1971

3,630,908

FERROELECTRIC AND PIEZOELECTRIC COMPOSITION

Mitsuo Osada and Osamu Kumon, Osaka, and Tatsuya Nishimoto, Hyogo, Japan, assignors to Sumitomo Electric Industries Ltd., Osaka, Japan
Filed Mar. 11, 1968, Ser. No. 712,192
Claims priority, application Japan, Jan. 8, 1968, 43/1,030
Int. Cl. C04b 35/46, 35/48
U.S. Cl. 252—62.9 4 Claims

ABSTRACT OF THE DISCLOSURE

Ferroelectric and piezoelectric composition comprising a solid solution of the ternary system X ($Pb(In_{1/2}Nb_{1/2})O_3$)-Y ($PbZrO_3$)-Z (PbTiO)

is disclosed. The constituents are defined by the formula $X+Y+Z=100$, wherein X, Y and Z are in the following ranges, taken with reference to the figure ABCDEFGH in FIG. 1:

| | X | Y | Z |
|---|---|---|---|
| A | 75 | 0 | 25 |
| B | 60 | 10 | 30 |
| C | 10 | 60 | 30 |
| D | 5 | 55 | 40 |
| E | 5 | 45 | 50 |
| F | 15 | 30 | 55 |
| G | 35 | 10 | 55 |
| H | 35 | 0 | 45 |

BACKGROUND OF THE INVENTION

Field of the invention

The invention relates to a novel ferroelectric and piezoelectric composition.

DESCRIPTION OF THE PRIOR ART

Ferroelectric and piezoelectric materials containing barium titanate, lead titanate zirconate and the like as their principal constituents are used in many diverse applications, such as transducers useful in devices such as wave filters for producing or sensing vibrations, elements for generating high voltage and the like.

SUMMARY OF THE INVENTION

The present invention relates to a ferroelectric and piezoelectric material having a novel composition.

A ferroelectric and piezoelectric material prepared in accordance with the present invention is characterized by intense ferroelectric and piezoelectric properties which are obtained by applying a DC voltage to a sintered ceramic material in the same manner by which ceramics of barium titanate or lead titanate zirconate are made, thereby polarizing the ceramic and providing a residual polarization to the ceramic. This property enables the ceramic to be advantageously used in transducers in all types of electrical devices.

BRIEF DESCRIPTION OF THE DRAWINGS

FIG. 2 is a diagram illustrating curves which indicate variations in the longitudinal coupling coefficient and the dielectric constant, respectively, of the material produced in accordance with the present invention when the ratio of lead titanate with respect to lead indate niobate is varied.

FIG. 3 is a diagram illustrating the curves which indicate the variation in the longitudinal coupling coefficient and the dielectric constant, respectively, of the material produced in accordance with the present invention when the ratio of lead titanate with respect to lead zirconate is varied and the content of lead indate niobate in the material is held to 10 mol percent.

DETAILED DESCRIPTION OF THE PREFERRED EMBODIMENTS

Figure 1:
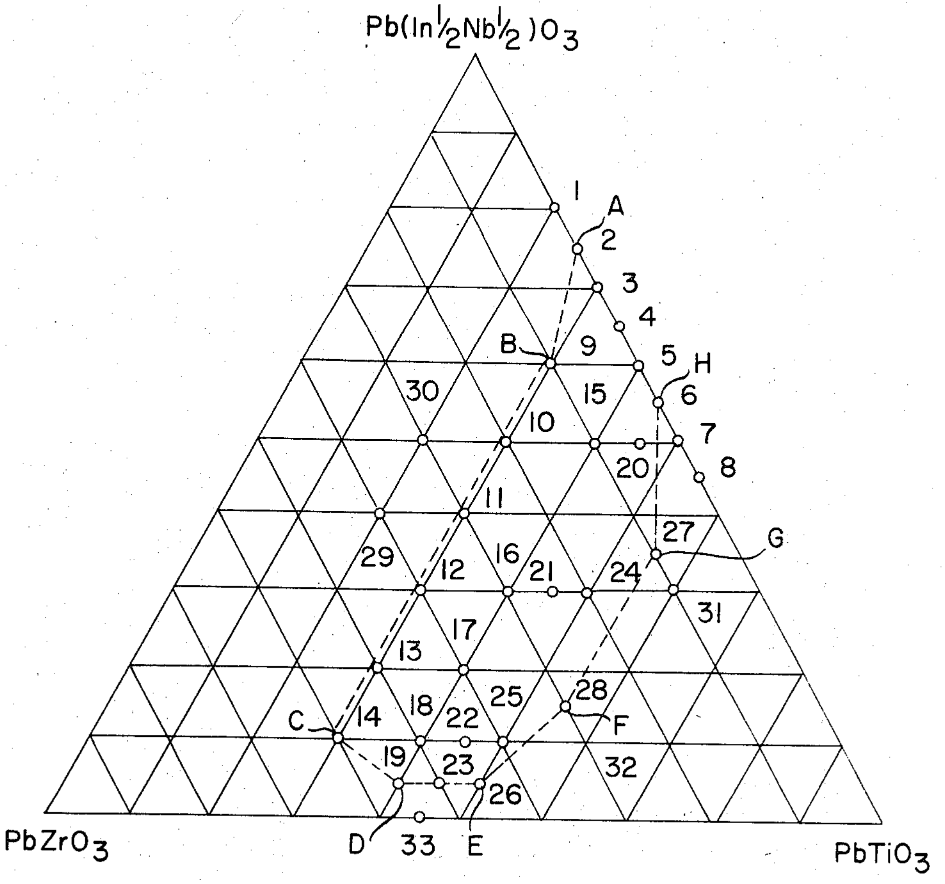
FIG. 1 is a triangular compositional diagram illustrating the various embodiments of the present invention.

The material produced in accordance with the present invention is composed of $Pb(In_{1/2}Nb_{1/2})O_3$-$PbTiO_3$-$PbZrO_3$.

All of the ceramics made of the ternary system in accordance with the present invention possess piezoelectric properties. However, from the view of industrial interest, the subject matter of the present invention is directed to the following range of each constituent of the material referred to in the diagram in FIG. 1:

| | | |
|---|---|---|
| X | $Pb(In_{1/2}Nb_{1/2})O_3$ | X=5-70 mol percent. |
| Y | $PbTiO_3$ | Y=25-55 mol percent. |
| Z | $PbZrO_3$ | Z=0-60 mol percent. |

wherein $X+Y+Z=100$.

The values of the coupling coefficient $k_{33}$ and the dielectric constant $\epsilon$ of the material are maximums at positions adjacent to the phase boundaries of $Pb(In_{1/2}Nb_{1/2})O_3$, $PbTiO_3$ and $PbZrO_3$ in the ternary system shown in FIG. 1, i.e., the above values are maximum when the content mol percent of each constituent is to fall on the lines connecting each of the middle points of sample numbers 19–23, 18–22, 16–21, 15–20, and 4–5, in FIG. 1. The above values decrease as the composition of the material is varied from the above described regions. From an industrial viewpoint, the preferred boundary is selected in the present invention to conform to the numerals A–B–C and E–F–G–H in FIG. 1.

The composition of the material containing $Pb(In_{1/2}Nb_{1/2})O_3$ is superior from the viewpoint of easiness of sintering and polarization of the material in comparison with the binary system consisting of $PbTiO_3$-$PbZrO_3$. Further, the Curie point of the composition containing $Pb(In_{1/2}Nb_{1/2})O_3$ is higher than that of the composition which does not contain $Pb(In_{1/2}Nb_{1/2})O_3$. The Curie point of composition sample number 16 is about 50° C. higher than that of a binary system in which the ratio of Zr to Ti is kept at about the same ratio as that of sample number 16. Accordingly, the lower limit of the composition wherein the inclusion of $Pb(In_{1/2}Nb_{1/2})O_3$ is recognized to give advantageous results is represented by the numerals C–D–E–F in FIG. 1.

In preparing the ceramic in accordance with the present invention, oxides such as $In_2O_3$, $Nb_2O_5$, $TiO_2$, $ZrO_2$ and the carbonates of the peroxides thereof which can easily be decomposed by heating to form the oxides may be utilized as raw materials. Since $ZrO_2$ usually contains a small amount of hafnium, it is possible to replace Zr by hafnium in the present invention. However, since hafnium is expensive in comparison with Zr, the selection of the constituents should be made from an industrial viewpoint.

EXAMPLE

The oxides in Table 1 were used as raw materials in powdered form since these were commercially available at a purity greater than 99.5%. The oxides were mixed together after each of the oxides was weighed to obtain the weight ratio shown in Table 1. The mixture was then dried, and heated at 800° C. for two hours so as to effect a temporary sintering thereof.

The temporarily sintered material was coarsely crushed, finely powdered and wet blended in a ball mill for 20 hours.

After the powdering and blending, an organic caking agent was added to the powder, and the thus prepared mixture was pressed so as to form a cylindrical shape having a diameter of 6 mm. and a length of 18 mm. The thus formed body was sintered in a platinum casing at a temperature ranging from 1230 to 1270° C. for three hours within an atmosphere of lead. The sintered body was ground into a shape having a diameter of 5 mm. and a length of 15 mm. with the opposite ends of the body being glazed with silver paint.

The thus formed element was polarized by applying a DC voltage of 2.5 kv./mm. in silicone oil at a temperature of 100° C. After the expiration of 100 hours from the time of polarization of the element, the physical properties of the element were measured by the methods defined by the IRE standard. Table 1 shows the test results, the longitudinal coupling coefficient being indicated by $k_{33}$, and the dielectric constant being indicated by $\epsilon$. The variation in properties due to the change in the ratio of $Pb(In_{1/2}Nb_{1/2})O_3$ with respect to $PbTiO_3$ is shown is FIG. 2. The variation in the properties due to the change in the ratio of $PbZrO_3$ with respect to $PbTiO_3$ when the content of $Pb(In_{1/2}Nb_{1/2})O_3$ is kept at 10 mol percent is shown in FIG. 3.

TABLE 1.—COMPOSITION—PROPERTIES (Refer to Figure 1)

| | Composition, mol percent | | | Sintering temp., ° C. | $k_{33}$, percent | $\epsilon$ |
|---|---|---|---|---|---|---|
| | $Pb(In_{1/2}Nb_{1/2})O_3$ | $PbTiO_3$ | $PbZrO_3$ | | | |
| 1 | 80 | 20 | 0 | 1230 | 22 | 500 |
| 2 | 75 | 25 | 0 | 1230 | 40 | 810 |
| 3 | 70 | 30 | 0 | 1230 | 52 | 1,100 |
| 4 | 65 | 35 | 0 | 1250 | 57 | 1,300 |
| 5 | 60 | 40 | 0 | 1250 | 50 | 1,020 |
| 6 | 55 | 45 | 0 | 1250 | 40 | 800 |
| 7 | 50 | 50 | 0 | 1250 | 27 | 680 |
| 8 | 45 | 55 | 0 | 1250 | 12 | 580 |
| 9 | 60 | 30 | 10 | 1250 | 42 | 870 |
| 10 | 50 | 30 | 20 | 1,250 | 41 | 500 |
| 11 | 40 | 30 | 30 | 1,250 | 42 | 550 |
| 12 | 30 | 30 | 40 | 1,250 | 45 | 420 |
| 13 | 20 | 30 | 50 | 1,250 | 46 | 530 |
| 14 | 10 | 30 | 60 | 1,270 | 45 | 500 |
| 15 | 50 | 40 | 10 | 1,250 | 53 | 760 |
| 16 | 30 | 40 | 30 | 1,250 | 61 | 1,100 |
| 17 | 20 | 40 | 40 | 1,250 | 56 | 630 |
| 18 | 10 | 40 | 50 | 1,250 | 60 | 320 |
| 19 | 5 | 40 | 55 | 1,270 | 45 | 550 |
| 20 | 50 | 45 | 15 | 1,250 | 45 | 750 |
| 21 | 30 | 45 | 25 | 1,250 | 62 | 1,150 |
| 22 | 10 | 45 | 45 | 1,250 | 64 | 1,220 |
| 23 | 5 | 45 | 50 | 1,270 | 52 | 920 |
| 24 | 30 | 50 | 20 | 1,250 | 42 | 610 |
| 25 | 10 | 50 | 40 | 1,250 | 38 | 570 |
| 26 | 5 | 50 | 45 | 1,250 | 62 | 630 |
| 27 | 35 | 55 | 10 | 1,250 | 39 | 600 |
| 28 | 15 | 55 | 30 | 1,270 | 41 | 740 |
| 29 | 40 | 20 | 40 | 1,250 | 37 | 470 |
| 30 | 50 | 20 | 30 | 1,250 | 35 | 450 |
| 31 | 30 | 60 | 10 | 1,250 | 25 | 420 |
| 32 | 10 | 60 | 30 | 1,250 | 27 | 300 |
| 33 | 0 | 55 | 45 | 1,270 | 45 | 770 |

Sample numbers 2–6 and 9–28 are included within the claims, whereas sample numbers 1, 7, 8 and 29–33 are excluded from the claims for the previously mentioned reasons though they also illustrate the piezoelectric properties.

It is well known in the art that mechanical losses in a ceramic composed of the ternary system $PbZrO_3$-$PbTiO_3$-$PbSnO_3$ can be reduced, and the dielectric constant thereof increased, by replacing a portion of the $Pb^{+2}$ with an alkaline earth. A similar effect can be obtained in the ternay system $Pb(In_{1/2}Nb_{1/2})O_3$-$PbTiO_3$-$PbZrO_3$ produced in accordance with the present invention by replacing a part of the $Pb^{+2}$ with an alkaline earth.

What is claimed is:

1. A ferroelectric-piezoelectric composition consisting essentially of a binary system consisting of $$Pb(In_{1/2}Nb_{1/2})O_3$$

and $PbTiO_3$, said $Pb(In_{1/2}Nb_{1/2})O_3$ being present in amounts of from about 55 to about 75 mol percent and said $PbTiO_3$ being present in amounts from about 45 to about 25 mol percent.

2. A ferroelectric-piezoelectric composition consisting essentially of a solid solution of a ternary system consisting of about 10 mol percent $Pb(In_{1/2}Nb_{1/2})O_3$, from 45 to 50 mol percent of $PbZrO_3$ and from 40 to 45 mol percent of $PbTiO_3$.

3. A ferroelectric-piezoelectric composition consisting essentially of a solid solution of a ternary system consisting of about 30 mol percent of $Pb(In_{1/2}Nb_{1/2})O_3$, from 25 to 30 mol percent of $PbZrO_3$ and from 40 to 45 mol percent of $PbTiO_3$.

4. A ferroelectric-piezoelectric composition consisting essentially of a solid solution of a ternary system consisting of about 50 mol percent of $Pb(In_{1/2}Nb_{1/2})O_3$, from 5 to 10 percent of $PbZrO_3$ and from 40 to 45 percent of $PbTiO_3$.

References Cited

UNITED STATES PATENTS 3,468,799 9/1969 Kurihara et al. ______ 252—62.9

3,468,800 9/1969 Yokoyama et al. _____ 252—62.9

TOBIAS E. LEVOW, Primary Examiner

J. COOPER, Assistant Examiner

U.S. Cl. X.R.

106—39 R